(12) United States Patent
Patil et al.

(10) Patent No.: US 11,819,874 B2
(45) Date of Patent: Nov. 21, 2023

(54) DISPENSER DEVICE FOR APPLYING STRUCTURAL ADHESIVE AND A METHOD USING SUCH A DISPENSER DEVICE

(71) Applicant: LM Wind Power US Technology ApS, Kolding (DK)

(72) Inventors: Shashidhar Patil, Bangalore (IN); Roelof Willem Schuring, Enschede (NL); Michael Wenani Nielsen, Kolding (DK); Suresh Babu Gangavar Pandarinath, Karnataka (IN); Rakesh Kumar Angural, Karnataka (IN)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 16/495,480

(22) PCT Filed: Mar. 22, 2018

(86) PCT No.: PCT/EP2018/057292
§ 371 (c)(1),
(2) Date: Sep. 19, 2019

(87) PCT Pub. No.: WO2018/172457
PCT Pub. Date: Sep. 27, 2018

(65) Prior Publication Data
US 2020/0094286 A1    Mar. 26, 2020

(30) Foreign Application Priority Data

Mar. 23, 2017    (EP) .................................. 17162532

(51) Int. Cl.
*B05C 3/18*        (2006.01)
*B29C 65/48*       (2006.01)
(Continued)

(52) U.S. Cl.
CPC .................. *B05C 3/18* (2013.01); *B05D 1/30* (2013.01); *B29C 65/483* (2013.01);
(Continued)

(58) Field of Classification Search
CPC ........... B05C 3/18; B05C 3/20; B05C 5/0204; B05C 5/0254; B05C 5/0216;
(Continued)

(56) References Cited

U.S. PATENT DOCUMENTS

| 922,676 | A | * | 5/1909 | Denton | .................... E04G 21/20 425/87 |
| 2,707,294 | A | * | 5/1955 | Nosin | ..................... B05C 17/12 15/244.1 |

(Continued)

FOREIGN PATENT DOCUMENTS

| CN | 102438799 A | 5/2012 |
| CN | 202316261 | * 7/2012 |

(Continued)

OTHER PUBLICATIONS

English Translation of Description Only of EP2447521A2, Kamke et al, published May 2, 2012 (Year: 2012).*

(Continued)

*Primary Examiner* — Laura Edwards
(74) *Attorney, Agent, or Firm* — Nath, Goldberg & Meyer; Jerald L. Meyer; Tanya E. Harkins

(57) ABSTRACT

This invention relates to a dispenser device for and a method of applying a structural adhesive to an application surface on a wind turbine blade structure, wherein the dispenser device comprises a housing forming a reservoir configured to hold a surplus of structural adhesive during dispensing. The reservoir is connected to an inlet for supplying the structural adhesive and an outlet for dispensing the structural adhesive. The outlet may be a side opening arranged in an exchange- (Continued)

able housing part. The dispenser device may also comprise an adjustable mechanism connected to a plate member configured to be moved relative to the side opening. The operation of the adjustable mechanism is controlled via a control unit or a control element. The exchangeable housing part or adjustable mechanism enables the cross-sectional profile, the width and/or the height of the dispensed structural adhesive to be changed before or during dispensing.

17 Claims, 7 Drawing Sheets

(51) Int. Cl.
    *B29C 65/52*     (2006.01)
    *B29C 65/00*     (2006.01)
    *B05D 1/30*     (2006.01)
    *B29L 31/08*     (2006.01)

(52) U.S. Cl.
    CPC ........ *B29C 65/4815* (2013.01); *B29C 65/524* (2013.01); *B29C 66/301* (2013.01); *B29C 66/54* (2013.01); *B29L 2031/085* (2013.01)

(58) Field of Classification Search
    CPC ........... B05C 5/0291; B05C 17/00516; B05C 17/00503; B05D 1/30; B29C 65/4815; B29C 65/483; B29C 65/524; B29C 66/301; B29C 66/54; B29L 2031/085; B29D 99/0025; B29D 99/0028
    USPC ................... 118/410, 429; 427/207.1, 430.1; 222/608, 613, 160; 141/284; 401/9, 10; 425/87
    See application file for complete search history.

(56) References Cited

U.S. PATENT DOCUMENTS

| | | | | |
|---|---|---|---|---|
| 3,396,218 A | * | 8/1968 | Despota | E04F 21/08 264/35 |
| 4,450,226 A | * | 5/1984 | Bloothoofd | B05C 5/005 118/410 |
| 4,898,117 A | * | 2/1990 | Ledermann | B23K 3/06 118/413 |
| 5,620,517 A | * | 4/1997 | Saitoh | B05C 5/0266 118/41 |
| 6,120,603 A | | 9/2000 | Bryant | |
| 2009/0038707 A1 | * | 2/2009 | Gaon | B05B 12/084 141/1 |
| 2013/0216703 A1 | | 8/2013 | Stillwell et al. | |

FOREIGN PATENT DOCUMENTS

| | | |
|---|---|---|
| CN | 204234276 U | 4/2015 |
| CN | 105562296 A | 5/2016 |
| EP | 2447521 A2 * | 5/2012 |
| EP | 2777825 A1 | 9/2014 |
| EP | 2447521 B1 | 11/2018 |
| JP | S61291061 A | 12/1986 |
| WO | 2014048440 A1 | 4/2014 |

OTHER PUBLICATIONS

English Abstract, CN202316261, Zhang, published Jul. 11, 2012 (Year: 2012).*
English Machine Translation Description (Only), CN202316261, Zhang, published Jul. 11, 2012 (Year: 2012).*
CN204486123U and English translation of CN204486123U, dated Jul. 22, 2015 (Year: 2015).*
EP0707937, Cornils et al, "Device for Extruding a Polymer Frame Onot a Plate-Shaped Object", published Apr. 24, 1996. (Year: 1996).*
Communication Pursuant to Article 94(3) EPC dated Jul. 8, 2021 corresponding to European application No. 17162532.0-1015.
Preliminary Office Action for tBrazilian patent application No. BR112019019707-9 dated Apr. 27, 2022.

* cited by examiner

DISPENSER DEVICE FOR APPLYING STRUCTURAL ADHESIVE AND A METHOD USING SUCH A DISPENSER DEVICE

This is a National Phase Application filed under 35 U.S.C. 371 as a national stage of PCT/EP2018/057292, filed Mar. 22, 2018, an application claiming the benefit of European Application No. 17162532.0, filed Mar. 23, 2017, the content of each of which is hereby incorporated by reference in its entirety.

TECHNICAL FIELD

The present invention relates to a dispenser device for applying a structural adhesive to a wind turbine blade structure, comprising a reservoir configured to receive and hold the structural adhesive, the reservoir is connected to a first opening configured to be arranged relative to an application surface, wherein the dispenser device is configured to apply said structural adhesive to the application surface when moving said dispenser device along the application surface.

The present invention further relates to a method of applying a structural adhesive to an application surface of a wind turbine blade structure using a dispenser device as described above.

BACKGROUND

Modern wind turbine blades can be manufactured by bonding individual blade shell parts together. Before joining the blade shell parts, one or more box beams or shear webs and optional trailing edge or leading edge reinforcements are positioned and bonded to one blade shell part using a structural adhesive. Structural adhesives are further applied to the gluing surfaces of the blade shell part, the box beam or shear web and the optional the trailing edge or leading edge reinforcements. The two blade shell parts are then brought into contact with each other so that matching gluing surfaces on the other blade shell part are brought into contact with the individual gluing surfaces via the structural adhesive.

The structural adhesive is applied using a dispensing system comprising a pump system coupled to containers holding the structural adhesive. The structural adhesive is then pumped via a hose to a dispenser nozzle which is operated manually by the technician. The dispensing system comprises a control unit using pressure sensors and flow meters to control the desired dispense rate and the adhesive components mixing ratio. The structural adhesive is pumped directly out of the dispenser nozzle and onto the application surface. The dispenser nozzle is shaped to the desired paste profile along the application surface. Various adhesive compositions are disclosed for limiting the slumping effect of the paste profile, e.g. by adding a thixotropic agent to the resin or hardener.

Several factors influence the application quality of the structural adhesive, such as flow rate of the structural adhesive, application accuracy and movement of the dispenser nozzle, pumping strokes of the dispensing system and the geometric profile of the application surface. The technician must therefore attempt to keep a constant walking speed and a steady hand during the application to form a uniform and continuous paste profile if manual application is chosen. Any of these factors may lead to an uneven distribution of adhesive and thus a non-uniform paste profile. As a result, the bonding effect may vary along the length of the glue line, thereby increasing the risk of air voids or cracks forming, or even separation between the respective gluing surfaces, during operation. Furthermore, any excess adhesive not removed before or after curing may break off and potentially damage the blade shell or other items inside the wind turbine blades during operation.

Instead of manually dispensing the structural adhesive, a robotic system can be used to control the relative movement of the dispenser nozzle. However, such automated dispensing systems are very expensive and requires additional free spacing around the manufacturing mould. The dispensing rate and pressure of such manual or automated systems are directly controlled by the pumping unit feeding the structural adhesive into the dispenser nozzles.

EP 2447521 A2 discloses an automated dispenser system wherein a robot arm is fitted with a dispenser nozzle coupled to a feeding unit. The rotor arm provides movement in three directions while the dispensing rate controlled by the feeding unit. It is stated that the profile of the opening of the nozzle can be adjusted using actuators or exchanged with a nozzle having another opening profile, however, further details about these embodiments are not provided.

WO 2014/048440 A1 discloses a dispensing system wherein a small wagon is moved along rails extending along the peripheral edge of the blade mould. The wagon is fitted with a dispenser nozzle which is coupled to a feeding unit. The wagon is moved along the rails to apply adhesive to the respective gluing surfaces of the blade part.

OBJECT OF THE INVENTION

An object of the invention is to provide a dispenser device and a method that solves the abovementioned problems.

Another object of the invention is to provide a dispenser device and a method that allows for a uniform and constant dispensing of a structural adhesive along the application surface.

Yet another object of the invention is to provide a dispenser device and a method capable of compensating for the geometrical changes of the wind turbine blade structure.

Another further object of the invention is to provide a dispenser device and a method that allows for an easy and quick dispensing of the structural adhesive.

An objection of the invention is also to provide a dispenser device and a method that allows for applying structural adhesives with varying dimensions or profiles.

DETAILED DESCRIPTION OF THE INVENTION

An object of the invention is achieved by a dispenser device for applying a structural adhesive to a wind turbine blade structure, comprising at least one inlet for supplying a structural adhesive into the dispenser device and at least one outlet for dispensing said structural adhesive out of the device, the at least one outlet is configured to be positioned relative to an application surface of the wind turbine blade structure, said at least one inlet comprises a coupling element configured to be coupled to a dispensing system, the dispensing system being configured to supply the structural adhesive into the dispenser device at a supply rate, wherein the dispenser device is configured to apply the structural adhesive onto the application surface at a dispense rate when the dispenser device is manually moved along said application surface, characterised in that the dispenser device further comprises a housing forming at least one reservoir configured to temporarily hold a surplus of structural adhesive during dispensing, the housing has a bottom side, a top side, a front side, a back side and two opposite sides located between the front side and the back side, wherein the bottom side is facing the application surface during dispensing, wherein the at least one reservoir is connected to said at least one inlet and further to said at least one outlet, the at least one reservoir is configured to equalise the dispense rate during dispensing.

This provides an improved dispenser device capable of compensating for variations in the geometry of the wind turbine blade structure, changes in the relative movement or moving speed of the dispenser device as well as other application factors, such as pump strokes of the pumping unit or variations in supply rate. The present configuration allows for a uniform and constant dispensing of the structural adhesive along the application surface. This is achieved by equalising the effects of multiple sources of application factors normally resulting in variations of the derived profile of the dispensed structural adhesive. This ensures a uniform bonding effect along the glue line and thus reduces the risk of air voids and cracks forming at the glue line during operation of the wind turbine blade, potentially leading to separation along at the glue line. The use of this dispenser device also allows the amount of waste adhesive to be reduced as well as reducing the amount of excess adhesive having to be removed after curing.

The present dispenser device can suitably be used to apply any suitable structural adhesives or bond pastes used during manufacturing of wind turbine blades, including any room temperature or temperature initiated curing adhesives. In example, but not limited to, the structural adhesive may be polymeric adhesives, multi-component and thixotropic adhesives, vinylester adhesives, methyl methacrylate adhesives, modified acrylics, epoxies, thermoset adhesives, thermoplastic adhesives or other types of structural adhesives or bond pastes. The structural adhesive or bond paste has suitable viscosity properties for application onto a desired surface of the wind turbine structure.

The dispenser device comprises a housing with a three-dimensional shape which defines a front side, a back side and two opposite sides located in between. In example, but not limited to, the housing may have a semi-spherical, a semi-ellipsoid, a pyramid, a cube, a cuboid, a cylindrical, a triangular prism, a pentagonal prism or another three-dimensional shape. The housing forms at least one reservoir configured to receive and temporarily hold at least one structural adhesive before being dispensed. The reservoir is connected to at least one inlet adapted for feeding a structural adhesive into the dispenser device. The reservoir is further connected to at least one outlet adapted for dispensing the structural adhesive onto a suitable application surface. The reservoir acts as a buffer for temporarily holding a surplus of structural adhesive during dispensing, thereby allowing for a constant and uniform dispense of structural adhesive. The reservoir may compensate for variations in the moving speed and relative movement of the dispenser device as well as changes in the contour of the application surface, because the reservoir may function as a pressure equalisation chamber during operation. Furthermore, the reservoir may also compensate for variations in the supply pressure or speed at which the structural adhesive is fed into the dispenser device.

The housing may form two or more reservoirs separated by internal walls, wherein the individual reservoirs may be connected to individual inlets and/or outlets. The reservoirs may be independently or synchronously supplied and/or dispensed. The dispenser device can thus be used to temporarily hold and dispense different structural adhesives at the same time. The dispenser device can further be used to dispense multiple lines of paste at the same time. The individual reservoirs may alternatively be interconnected via a common inlet and/or outlet, thereby providing a better distribution of the surplus of structural adhesive inside the dispenser device during dispensing.

The present dispenser device may suitably be used to dispense the structural adhesive at a substantially uniform volume as function of the relative moving speed. The reservoir allows for a continuous uniform dispensing along the application surface independent of variations in the supply rate, e.g. changes in pumping pressure due to pump strokes and other fluctuation of the dispensing system. The reservoir is shaped to hold a maximum volume before spilling over. This enables the technician to adjust the dispensing volume in relation to the volume of structural adhesive in the reservoir.

The housing and/or exchangeable housing parts may be made of any suitable material, such as thermoplastics, fibre reinforced materials or composites, metal e.g. steel or aluminum, or polypropylenes. The housing and/or exchangeable housing parts may also be made of any suitable disposable or reusable materials.

According to one embodiment, said top side comprises at least one top opening connected to the at least one reservoir or a top surface in which at least one transparent window is arranged.

The housing further defines a top side and a bottom side located between the front side and the back side. The bottom side is configured to contact or face the application surface during dispensing of the structural adhesive while the top side is facing away from the application surface during dispensing of the structural adhesive.

The housing may comprise at least one top opening arranged in the top side, wherein said at least one top opening may be connected to the reservoir. The top opening may be a common opening connected to each individual reservoir. Alternatively, individual top openings may be connected to each of the reservoirs. The top opening(s) may be arranged in a top plate of the housing, or may define the entire top side of the housing. This may enable the technician to access to the reservoirs for cleaning, maintenance or other services. The top opening(s) may also function as an inlet, thereby enabling the technician to manually feed structural adhesive into the dispenser device.

The top plate may form an integrated part of the housing, e.g. an integrated wall. Alternatively, the top plate may be attached to the housing, e.g. a wall thereof, by means of fasteners (like screws, bolts or rivets), a mechanical coupling, a hinge, an adhesive, welding or other attachment techniques. This shields the reservoirs from the surrounding environment and thus prevents dust, water or other items from entering the reservoirs and thereby contaminating the structural adhesive. This also allows for replacement or removal of the top plate during servicing or maintenance. Alternatively, only a part of the top plate may be removed while other part of the top plate remains attached to or integrated into the housing.

The individual top openings in the top plate may be covered by a window made of a transparent material, e.g. acrylic, butyrate, polycarbonate, polyethylene terephthalate or another transparent material. The window(s) may be fixed to the top plate or be pivotally connected to the top plate via a hinge. Alternatively, the top plate may be entirely of the transparent material and thus act as a window. This enables the technician to perform a visual inspection of the amount of structural adhesive in the reservoir during dispensing. The technician may then adjust the moving speed of the dispenser device during dispensing based on the variation in the amount of structural adhesive inside the reservoir.

According to one embodiment, said housing further comprises at least one exchangeable housing part, wherein the at least one outlet is a side opening arranged in said at least one exchangeable housing part, the side opening defines a cross-sectional profile, a width and a height of the dispensed structural adhesive.

The abovementioned outlets of the dispenser device may be formed by one or more side openings arranged in the housing, wherein each side opening may be shaped to form a predetermined profile with a predetermined width and height. The dispensed structural adhesive will thereby form at least one line of paste which substantially will take form after the dimensions of the side openings. The dispensed structural adhesive will thus have a cross-sectional profile, a width and a height substantially matching that of the side opening.

The side openings may be arranged in the front side, the back side or one of the opposite sides located in between. For example, the side openings may be arranged in the front side. The side opening(s) may be arranged adjacent to a bottom plate of the housing. Alternatively, the side opening may extend further along a portion of the bottom side, or along the entire bottom side, to form a combined side and bottom opening. The friction force between the structural adhesive and the application surface may then be used to facilitate the dispensing of the structural adhesive. The bottom plate may form an integrated part of the housing, e.g. an integrated wall. Alternatively, the bottom plate may be attached to the housing, e.g. a wall thereof, by means of fasteners (like screws, bolts or rivets), a mechanical coupling, an adhesive, welding or other attachment techniques.

The housing may comprise at least one exchangeable housing part, e.g. a wall or wall section, in which the abovementioned side openings may be located. In example, the exchangeable housing part may be located on the front side only, or may partly extend along the front side and the bottom side. In example, a first exchangeable housing part may be arranged on the front side and a second exchangeable housing part may be arranged on the bottom side. In example, the respective front, back or side wall of the housing may comprise a fixed wall section and an exchangeable wall section with said side opening. This allows the technician to select a desired housing part from a set and thus a desired paste profile.

The abovementioned set may comprise a number, e.g. at least two, of individually exchangeable housing parts each with different profiles, widths and/or heights of the side openings. This also allows the housing part to be exchanged prior to dispensing, thereby changing the cross-sectional profile, the width and/or the height of the line of paste, e.g. the dispensed structural adhesive.

The exchangeable housing part(s) may be attached to the rest of the housing by means of a mechanical coupling, a snap-fit coupling, clamping elements or other suitable attachment techniques. In example, the exchangeable housing part may comprise a male coupling element, e.g. a tongue, configured to be positioned in a female coupling element, e.g. a groove, located on the housing. The exchangeable housing parts may thus be slid in or out of position relative to the rest of the housing. Alternatively, the individual housing parts may comprise intermediate coupling elements enabling the housing parts to be slid in or out of position relative to each other. Thereby, the individual housing parts may be interconnected to form the desired cross-sectional profile, width and/or height.

According to one embodiment, the dispenser device further comprises an adjustable mechanism configured to change at least the cross-sectional profile, the width or the height of the dispensed structural adhesive.

The dispenser device may additionally or alternatively comprise one or more adjustable mechanisms configured to change the cross-sectional profile, the width and/or the height of the dispensed structural adhesive. This allows the technician, during dispensing, to change the dimensions and/or profile of the dispensed line of paste. This eliminates the need for temporarily stopping the dispensing in order to change the current dispenser nozzle as well as the need for changing the dispenser nozzle between different application surfaces.

The adjustable mechanism may comprise an electrical, pneumatic or hydraulic drive or driveable unit, wherein the operation of the drive or driveable unit may be controlled via a control unit. The drive or driveable unit may be mounted onto or integrated into the dispenser device, e.g. the housing. The drive unit may include an internal energy source, e.g. a battery or battery pack, used to actively power the moveable and/or electrical components of the adjustable mechanism. Alternatively, the adjustable mechanism may be driven by an external energy source, e.g. a hydraulic or pneumatic drive system, which may be coupled to the driveable unit via a suitable coupling. In example, the drive or driveable unit may comprise one or more electrical, pneumatic or hydraulic operated motors or actuators. This allows the technician to change the cross-sectional profile, the width and/or the height of the dispensed structural adhesive without having to replace the dispenser nozzle.

The adjustable mechanism may also be manually driven by one or more mechanical operated sliders, knobs or handles located on the dispenser device, e.g. the housing. These user operated control elements may be connected to the moveable components and configured to mechanically move these components. This also allows the technician to change the cross-sectional profile, the width and/or the height of the dispensed structural adhesive without having to replace the dispenser nozzle.

The user operated control elements and/or the moveable components may further be connected to one or more spring elements configured to bias the movement of these elements or components. This pushes or pulls the control element or moveable component towards a predetermined position during operation.

In one example, but not limited to, the adjustable mechanism may be comprise one or more inflatable structures arranged relative to the side openings, wherein this structure(s) is connected to the drive or driveable unit. The inflation or deflation of this structure(s) causes a change in the cross-sectional profile, the width and/or the height of the respective side opening and thus of dispensed structural adhesive.

According to a special embodiment, said at least one outlet is a side opening arranged in the housing and said adjustable mechanism is connected at least one moveable plate member, wherein said at least one moveable plate member is configured to be moved relative to the side opening causing a change in at least the cross-sectional pro-file, the width or the height of the dispensed structural adhesive.

In another example, but not limited to, the abovementioned adjustable mechanism may be connected to one or more moveable components in the form of plate members arranged relative to the side openings. The plate member(s) may be configured to be extended or retracted in the width direction, the height direction or in a combined width and height direction. The width direction extends between the two opposite sides of the dispenser device while the height direction extends between the bottom and top sides of the dispenser device. The cross-sectional profile of the side opening and thus the line of paste, e.g. the dispensed structural adhesive, are orientated parallel to the width direction.

The adjustable mechanism and the plate member may be connected via a shaft, e.g. piston shaft, a connecting rod or bar, or another suitable mechanical connection. Movement of the plate members can thus be controlled via the adjustable mechanism.

The individual plate members may each be slidably arranged in a guidance structure, e.g. a groove or track, configured for guiding the plate member between the retracted and extended positions. The plate members may be arranged on an exterior or interior surface of the housing, or within the side opening extending between the exterior or interior surfaces. This allows the plate members to be guided into position relative to the side opening.

The plate member and the side opening may each have a local top side facing the top side of dispenser device, a local bottom side facing the bottom side of the dispenser device, and two opposite local sides located in between. The local bottom side of the plate member, the top side of the side opening and/or the opposite local sides of the plate member and the side opening may have a straight edge profile, a V-shaped profile, a curved edge profile or another edge profile. In example, a local side of the plate member and a local side of the side opening, both facing in the same direction, may have the same edge profile. In example, the local bottom side of the plate member and the local top side of the side opening may have the same edge profile. This allows the width and/or height of the line of paste to be changed by moving the plate member. The two local sides may instead have different edge profiles. The local bottom side of the plate member and the local top side of the side opening may instead have different edge profiles. This allows the cross-sectional profile of the line of paste to be changed by moving the plate member.

The use of different edge profiles allows the cross-sectional profile of the dispensed structural adhesive to be changed, e.g. gradually, from a first profile to a second profile, or vice versa. In example, the first profile may be a triangular, trapezoid or pentagonal profile. In example, the second profile may be rectangular or squared profile.

According to a further special embodiment, said at least one moveable plate member comprises a first moveable plate member and at least a second moveable plate member, wherein the first moveable plate member is configured to be moved independently or synchronously relative to the at least second plate member.

The dispenser device may comprise a single plate member arranged to the side opening(s). In example, the plate member may be located adjacent to the local top side of the side opening so that it can be moved in the height direction and thus change the height of the dispensed structural adhesive. In example, the plate member may be located adjacent to a local side of the side opening so that it can be moved in the width direction and thus change the width of the dispensed structural adhesive.

The dispenser device may also comprise a plurality of plate members arranged relative to the side opening(s). The individual plate members may be connected to a common adjustable mechanism or to individual adjustable mechanisms. This enables the individual plate members to be controlled individually or synchronously.

A first plate member may be arranged relative to the local top side of the side opening. A second plate member may be arranged relative to one of the local sides of the side opening and, optionally, a third plate member may be arranged relative to the other of the local sides of the side opening. The first plate member may partly overlap the second plate member and the optional third plate member when placed in the extended positions. The first, second and optional third plate members may thus be moved to change the height and/or width of the dispensed structural adhesive. The use of plurality of plate members increases the adjustment functionality of the dispenser device.

According to yet another special embodiment, said adjustable mechanism is at least one actuator unit electrically connected to a control unit configured to control the movement of the at least one actuator unit, or said adjustable mechanism comprises at least one row of holes or at least one elongated hole arranged on at least the housing or the at least one moveable plate member, wherein said holes or said at least one elongated hole is configured to receive a fastener element.

As described earlier, the dispenser device may be suitably operated using a control unit. The control unit may have a user interface for controlling the operation of the drive or driveable unit. The control unit may be connected to the drive or driveable unit via a wired or wireless connection. The control unit may be arranged on the housing or a handle connected to the housing. The drive or driveable unit may be an actuator unit, e.g. a linear actuator unit. The actuator unit may be a hydraulic, pneumatic, mechanical, electro-mechanical actuator or another type of actuator. This allows the technician to control the operation of the dispenser device, wherein the plate member can be positioned in any position between the retracted and extended positions.

As also described earlier, the dispenser device may be operated using a user operated control element. The control element may be rotatably or pivotally connected to the housing of the dispenser device, wherein the control element at the other end may be further connected to the plate member. Rotating or pivoting the control element about a rotation or pivot point causes the plate member to move relative to the side opening. The housing, or a separate plate attached to the housing, may comprise a row of holes or projecting teeth configured to engage a matching tooth or hole on the control element. This allows the plate member to be positioned in a plurality of predetermined positions defined by said row of holes or projecting teeth.

The plate member may comprise a row of holes while the housing may comprise a matching hole, e.g. elongated hole, or vice versa. The hole of the housing may be aligned with a selected hole of the plate member and a fastener element may be placed in the aligned holes. The fastener element may be a bolt configured to be secured using a nut, or a pin configured to be secured using a locking split or a biasing spring element. The fastener element may thus be used to hold the plate member in the desired position. The plate member can thus be positioned in a plurality of predetermined positions defined by said row of holes or elongated hole.

According to another further special embodiment, the dispenser device further comprises at least one distance measuring unit electrically connected to the control unit, wherein the control unit configured to determine a travelled distance along the application surface.

One or more sensors or measuring units may be arranged on the dispenser device, e.g. the housing, for measuring and/or monitoring one or more parameters relating to the dispensing. For example, a flow rate sensor configured to measure a flow rate of the dispensed structural adhesive, thereby allowing the technician to monitor the dispensing rate. For example, a pressure sensor configured to measure an air pressure inside the reservoir above the structural adhesive, thereby allowing the technician to monitor the dispensing rate. For example, a temperature sensor configured to measure the temperature of the structural adhesive, thereby allowing the technical to monitor any premature curing thereof. For example, a vision sensor configured to detect or measure the colours of the structural adhesive, thereby allowing the technician to monitor the mixing quality of the components of the structural adhesive, e.g. via an image processing system. The sensors or measuring units may be connected to the control unit which processes the respective measured signals. The control unit may be configured to calculate and/or display suitable parameters relating to the dispensing based on said measured signals. This may allow the technician to monitor the dispensing in order to apply a substantially uniform and constant line of paste onto the application surface.

A low-level sensor and a high-level sensor may alternatively or additionally be positioned relative to the reservoir and connected to the control unit. The level sensors may be configured to detect a corresponding level of the structural adhesive within the reservoir. For example, the level sensors may be capacitive sensors, optical sensors, magnetic sensors or resistive sensors. The signals from these level sensors may be used to provide a visual warning to the technician during dispensing and/or to control the start and stop of a dispensing system, as described later.

A distance measuring unit may alternatively or additionally be arranged on the dispenser device. The distance measuring unit may be configured to measure a travelled distance along the application surface relative to a reference or starting point. For example, the distance measuring unit may be a laser distance measuring unit, a distance measuring wheel, an odometer, a global positioning (GPS) system or another suitable distance measuring unit. Another measuring unit configured to measure the height and/or width of the dispensed paste may alternatively or additionally be arranged on the dispenser device. For example, this measuring unit may be a laser or electromagnetic distance measuring unit, an ultrasonic sensor, or another contactless measuring unit. The various measuring units mentioned above may be connected to the control unit which processes the measured signals. The control unit may be configured to control the dispense rate, the cross-sectional profile, the width and/or the height of dispensed structural adhesive as function of the travelled distance.

The technician may enter one or more set-points or reference values into the control unit for controlling the dispense rate or dispensed volume. The control unit may optionally use these reference values to gradually change the position of the plate member(s) as the dispenser device is moved along the application surface.

The dispenser device may in a simple configuration comprise a handle unit for the technician which is attached to the housing, wherein the top opening in the top side functions as the inlet. Structural adhesive may thus be supplied manually via this top opening. The handle unit may for example comprise a shaft, e.g. a telescopic shaft, connected to a handle at one end and further to the housing at the other end. This provides a cheap and lightweight dispenser device.

In an embodiment, the inlet comprises a coupling element arranged on the housing, e.g. on the back side. The coupling element may be configured to be coupled to an external dispensing system for supplying the structural adhesive at a predetermined pressure. The coupling element may be located on a tube section projecting from the housing, wherein this tube section is connected to a side opening of the housing. This tube section may further be connected to a handle for the technician. Alternatively, the tube section may in itself function as the handle for technician.

A distributing plate may be arranged in the reservoir above the inlet, wherein the distributing plate is configured to distribute the supplied structural adhesive inside the reservoir. The distributing plate may extend along a portion of the reservoir so that a surplus of structural adhesive may flow over this plate. This ensures a uniform dispensing and reduces the risk of the structural adhesive flowing over the top of the dispenser device.

According to one embodiment, the dispenser device is configured to apply the structural adhesive at a pressure between 0.1 bars and 10 bars.

The present dispenser device may suitable used to dispense the structural adhesive with an application pressure between 0.1 bars to 10 bars, e.g. between 2 bars to 8 bars. The dispensing pressure may alternatively be measured at the dispensing system coupled to the dispenser device. This allows the technician to apply the structural adhesive using a desired application speed or moving speed.

The present dispenser device may suitable be moved manually along the application surface in a manual application process. Alternatively, an automated system, e.g. a robotic system, may be coupled to the dispenser device for moving the dispenser device automatically along the application surface in an automated application process.

An object of the invention is also achieved by a method of applying a structural adhesive to an application surface on a wind turbine blade structure, comprising:

providing a dispenser device having at least one inlet and at least one outlet, providing a dispensing system configured to be coupled to said dispenser device, supplying a structural adhesive into the dispenser device via said at least one inlet at a predetermined supply rate, manually dispensing the structural adhesive via said at least outlet onto the application surface at a dispense rate, characterised in that the method further comprises the step of:

the dispenser device is configured as described above, wherein said at least one reservoir in the dispenser device is at least partly filled with the structural adhesive to equalise said dispense rate during said manually dispensing.

This provides improved method of dispensing structural adhesive onto an application surface, wherein the use of the dispenser device described above ensures a constant and uniform dispensing along the application surface regardless of the geometry of the wind turbine blade structure. Any shaking or any variations in the moving speed may be compensated by the surplus of structural adhesive located in the reservoir. The structural adhesive may be applied under the force of gravity which acts on the volume of structural adhesive in the reservoir.

If the dispense rate is greater than the supply rate, then additional structural adhesive is supplied from the reservoir. If the dispense rate is lower than the supply rate, then the surplus of structural adhesive is fed into the reservoir. A predetermined volume of structural adhesive may be supplied before dispensing, and then dispensed along the application surface. If needed, the dispenser device may be resupplied with structural adhesive during dispensing via the dispensing system or by manually supplying the structural adhesive via containers. Variations in the supply pressure of the structural adhesive may be equalized by varying the amount of structural adhesive inside the reservoir.

Conventional dispenser nozzles are not able to compensate for any shaking or variations in the moving speed of the dispenser nozzle, as the structural adhesive is fed directly from the dispensing system and out of the nozzle opening. If technician moves the dispenser nozzles to slow, an excess amount of structural adhesive is applied onto the application surface which needs to be removed before or after curing. If technician moves the dispenser nozzle to fast, an insufficient amount of structural adhesive is applied onto the application surface which may lead to delamination or air bubbles in the glue line.

The present dispenser device may be fitted with a top opening or transparent window. The technician may thus perform a visual inspection of the amount of the structural adhesive in the reservoir during dispensing and then adjust the moving speed of the dispenser device accordingly. The technician may also perform a visual inspection to identify any air bubbles or unmixed components in the structural adhesive and act accordingly. The current dispense rate or volume of the structural adhesive may be displayed to the technician via the control unit on the dispenser device, thereby allowing to monitor the dispense rate or volume. Alternatively, the technician may use one or more reference markings located on an inner surface of the reservoir to indirectly monitor the moving speed or dispensed rate or volume.

The present dispenser device can suitably be used to apply a structural adhesive onto any application surface located on the wind turbine blade structure. In example, but not limited to, the wind turbine blade structure may be a blade shell part, a shear web, a box beam, a trailing or leading reinforcement, a bulkhead, ribs, scotts or another type of wind turbine blade structure. The present dispenser device may further be used to compensate for any variations in the geometric profile of the application surface, e.g. due to pre-bending or twisting of the wind turbine blade. This is not possible when using conventional dispenser nozzles.

In an embodiment, an external dispensing system is suitably used to supply the structural adhesive into the dispenser device via a hose. The dispensing system, e.g. the hose thereof, may be coupled to the dispenser device via matching coupling elements. The structural adhesive may be supplied at a predetermined supply rate and/or pressure via a pumping unit in the dispensing system. The pumping unit may in example, but not limited to, be a piston pump, a plunger pump, a screw pump, a gear pump or another positive displacement pump. The components of the structural adhesive may be mixed together in the dispensing system before pumping, alternatively, in the hose or in the dispenser device. This allows for an automatic supply of structural adhesive.

Alternatively, the structural adhesive may be manually supplied into the dispenser device via a top opening. Additional structural adhesive may thus be supplied, e.g. by another technician, to the reservoir during dispensing, if needed, using suitable containers or by positioning the hose of the dispensing system at the top opening. This allows for a manual supply of structural adhesive.

The operation of the dispensing system may in example be controlled using low-level and high-level sensors integrated in the dispenser device. The signal from the low-level sensor may be used to activate the dispensing system, e.g. start pumping, while the signal from the high-level sensor may be used to deactivate the dispensing system, e.g. stop pumping. The activation and deactivation of the dispensing system may be controlled manually using user operated control knobs or automatically via the control unit.

The present dispenser device allows the technician to dispense a substantially uniform amount of structural adhesive independent of the selected pumping pressure and other fluctuation of the dispensing system. For example, the technician may adjust the moving speed without having to adjust the supply rate of the dispensing system accordingly, since the reservoir acts to equalize any variations between the dispensed rate and the supply rate. This allows for the use of a pumping unit having a greater fluctuation compared with the use of conventional dispenser nozzles.

According to one embodiment, the structural adhesive is applied at a pressure between 0.1 bars to 10 bars.

The structural adhesive may suitably be dispensed with an application pressure ranging between 0.1 bars to 10 bars measured at the dispensing system. This allows the technician to regulate the moving speed of the dispenser device as it is moved along the application surface. The moving speed may be adjusted in relation to the amount of structural adhesive located in the reservoir.

According to one embodiment, the method further comprises at least one of the steps of:

changing a cross-sectional profile of said at least one outlet of the dispenser device prior to dispensing the structural adhesive, changing a width of said at least one outlet of the dispenser device prior to dispensing the structural adhesive, changing a height of said at least one outlet of the dispenser device prior to dispensing the structural adhesive.

Before dispensing, the dispenser device may be adapted to apply a line of paste with a desired cross-sectional profile, width and/or height. This eliminates the need for fitting the hose of the dispensing system with a different dispenser nozzle.

The dispenser device may be adapted prior to application by altering the cross-sectional profile, width and/or height of the outlet, e.g. the side opening, via the adjustable mechanism. The cross-sectional profile, width and/or height may be changed via the control unit or the control elements. This further saves costs as no extra dispenser nozzles are required.

The dispenser device may also be adapted by exchanging the housing part of the dispenser device. The housing part currently located in the dispenser device may be removed and a selected housing part having the desired cross-sectional profile, width and/or height may be attached to the dispenser device. This allows the technician to quickly and easily adapt the dispenser device before dispensing.

According to one embodiment, the method further comprises at least one of the steps of:

changing a cross-sectional profile of said at least one outlet of the dispenser device from a first cross-sectional profile to at least a second cross-sectional profile during said dispensing the structural adhesive, changing a width of said at least one outlet of the dispenser device from a first width to at least a second width during said dispensing the structural adhesive, changing a height of said at least one outlet of the dispenser device from a first height to at least a second height during said dispensing the structural adhesive.

Unlike conventional dispenser nozzles, the present dispenser device can further be adapted in-situ or during dispensing to change the current cross-sectional profile, width and/or height of the applied line of paste. The cross-sectional profile, width and/or height of the side opening and thus the dispensed structural adhesive may be changed by operating the control elements or the control unit. The cross-sectional profile, width and/or height may be changed simultaneously with dispensing the structural adhesive. Alternatively, the dispensing may be temporarily stopped during the change and then resumed once the change is completed. This allows for a quick and simple adaptation without having to disrupt the dispensing in order to replace the dispenser nozzle and then restarting the dispensing.

The present dispenser device significantly improves the application accuracy and quality as described above compared to the use of conventional dispenser nozzles. The present dispenser device further reduces the total application time and the time needed to adapt the dispenser device to a different application surfaces be it for a manual or automated application process.

DESCRIPTION OF DRAWINGS

The invention is explained in detail below with reference to embodiments shown in the drawings, in which.

LIST OF REFERENCES

Figure 1:
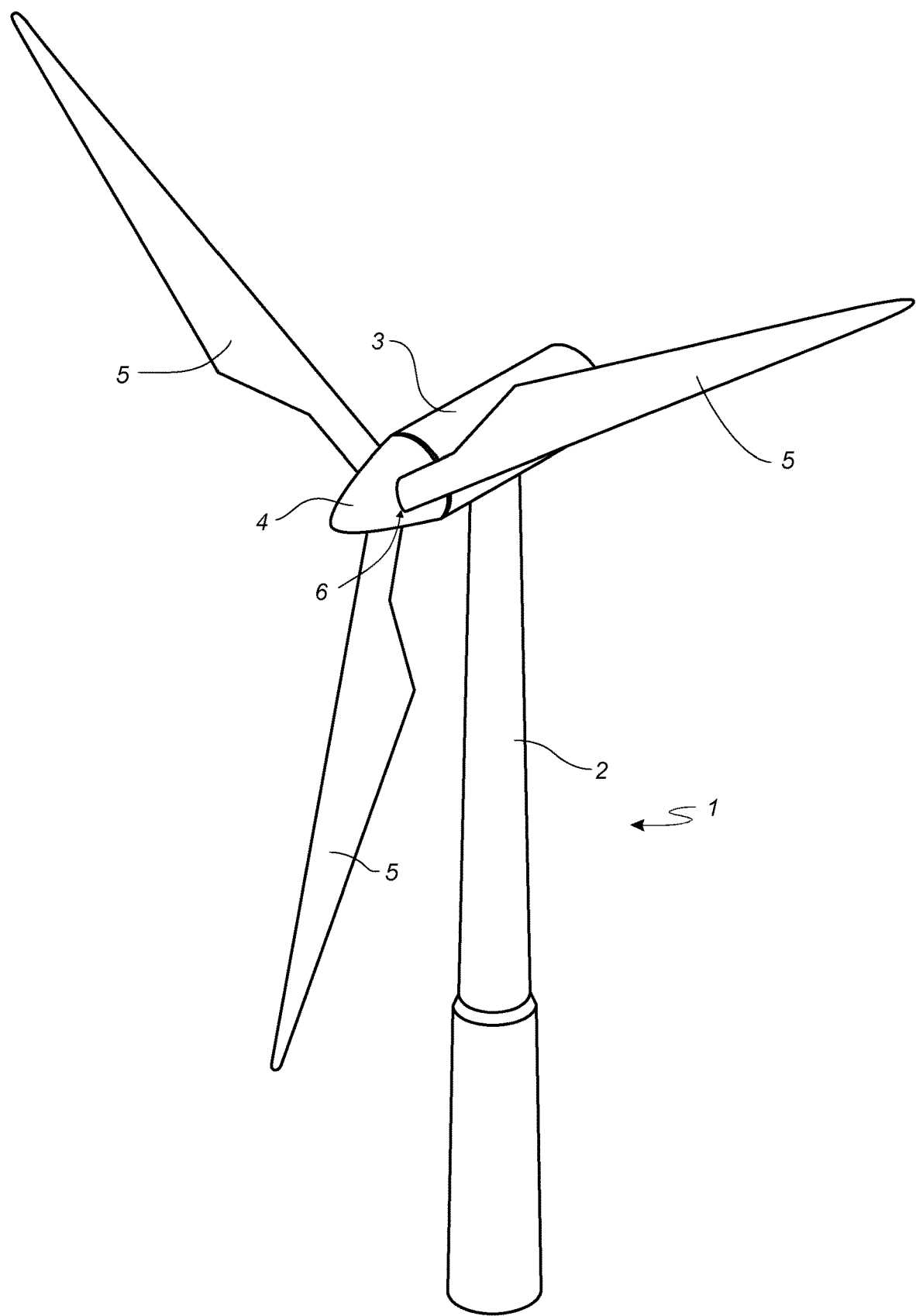
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Longitudinal length
18. Chord length
19. Dispenser device
20. Housing
21. Front side
22. Back side
23. Opposite sides
24. Reservoir
25. Inlet
26. Coupling element for dispensing system
27. Outlet
28. Bottom plate
29. Coupling elements for exchangeable housing part
30. Bottom side
31. Top side
32. Mounting holes for a distributing plate
33. Exchangeable housing part
34. Coupling elements for housing
35. Distributing plate
36. Holes for mounting of the distributing plate
37. Top plate
38. Projecting elements, fingers
39. Window
40. Dispenser device
41. Actuator unit
42. Plate member
43. First plate member
44. Second plate member
45. Row of holes
46. Elongated hole
47. Control unit
48. Distance measuring unit
49. Application surface
50. Dispensing system
51. Line of paste
52. Handle unit
53. Top opening
54. Container for holding structural adhesive The listed reference numbers are shown in abovementioned drawings where no all reference numbers are shown on the same figure for illustrative purposes. The same part or position seen in the drawings will be numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2 via a yaw bearing unit. The rotor comprises a hub 4 and a number of wind turbine blades 5, here three wind turbine blades are shown. The rotor may comprise a smaller or greater number of wind turbine blades 5. The hub 4 is connected to a drive train located in the nacelle 3 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
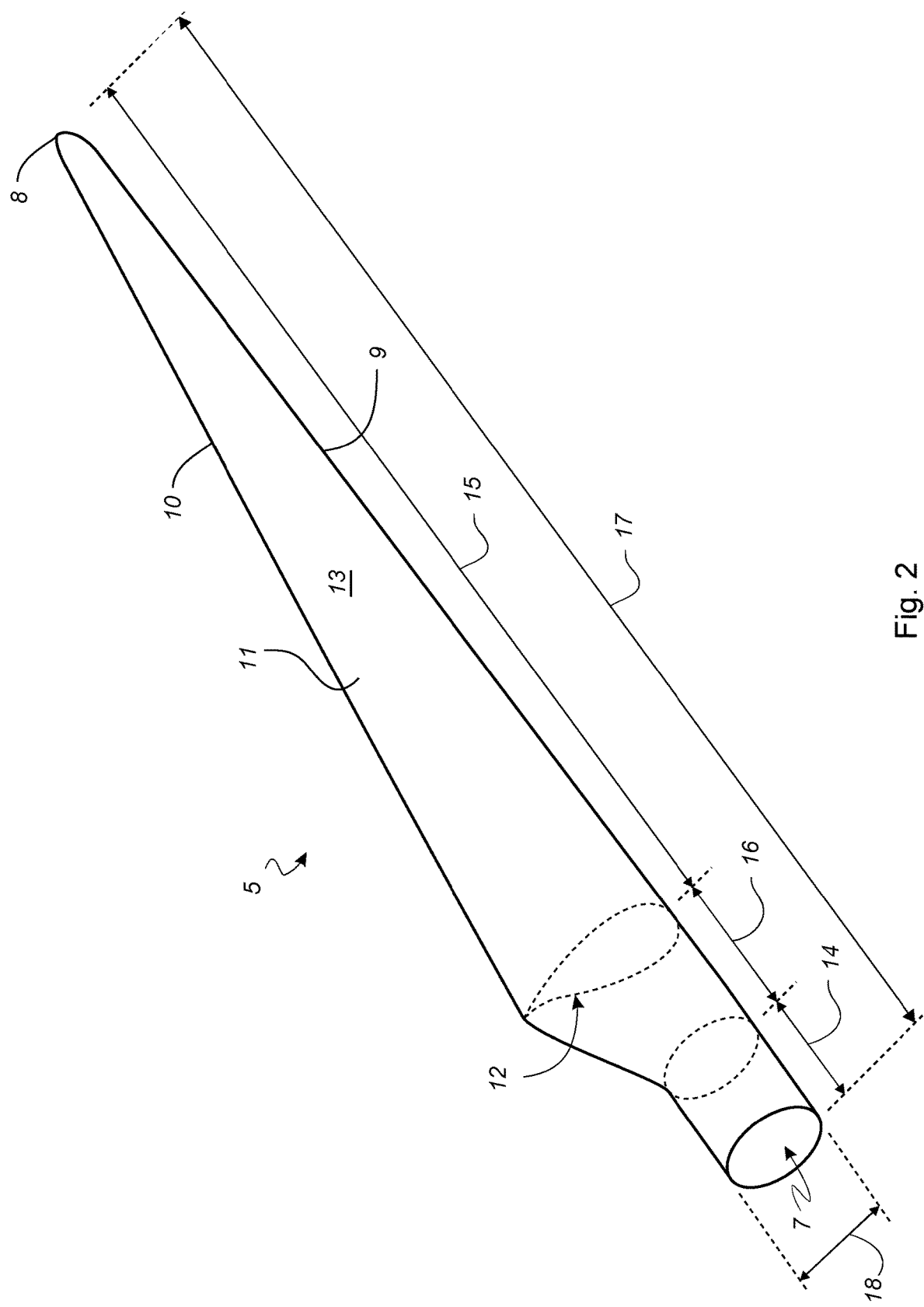
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing first outer surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition area 16. The wind turbine blade 5 has a longitudinal length 17 of at least 35 meters measured between the tip end 8 and the blade root 7. The wind turbine blade 5 further has a chord length 18 measured between the leading edge 9 and the trailing edge 10, wherein the wind turbine blade 5 has a maximum chord length 18 of at least 1.5 meters.

Figure 3:
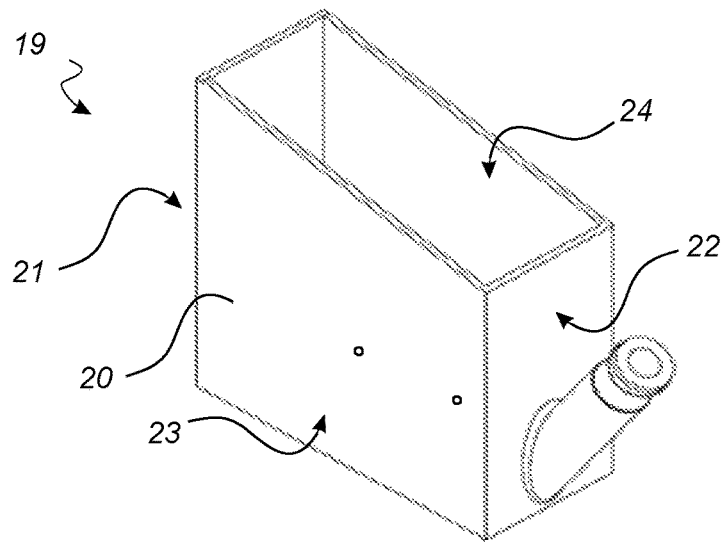
FIG. 3 shows a first exemplary embodiment of a dispenser device according to the invention.

FIG. 3 shows a first exemplary embodiment of a dispenser device 19 used during the manufacturing process of the wind turbine blade 5. The dispenser device 19 is configured to apply a structural adhesive to an application surface (see FIG. 12) of a wind turbine blade structure.

The dispenser device 19 comprises a housing 20 having a three-dimensional shape which defines a front side 21, a back side 22 and two opposite sides 23. Here, the housing 20 has a rectangular shape, but any three-dimensional shape may be used. The housing 20 form a reservoir 24 which is enclosed by at least the respective walls of the housing 20.

The reservoir 24 is configured to receive and temporarily hold a surplus of structural adhesive before dispensing. The reservoir 24 thus acts as a buffer capable of compensating for variations in the movement speed of the dispenser device 19 and in the geometry of the application surface.

Figure 4:
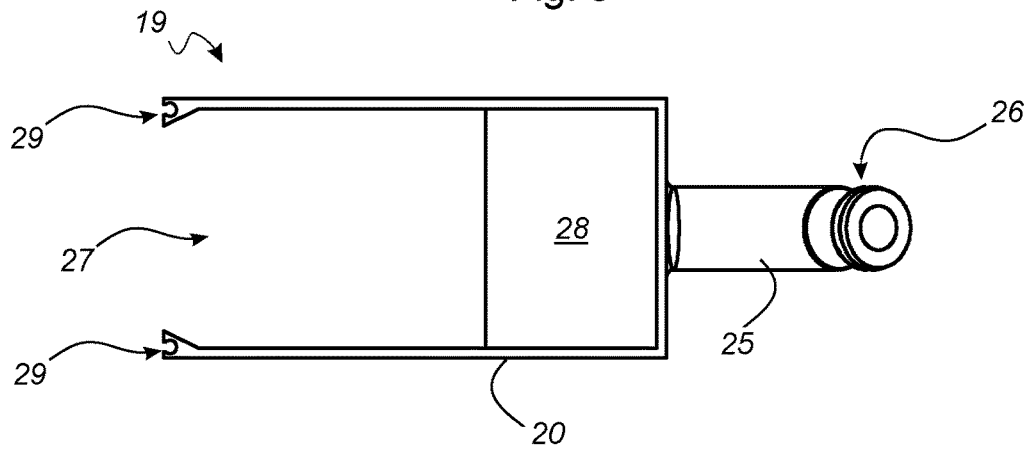
FIG. 4 shows the dispenser device of FIG. 3 seen from the top side.
Figure 5:
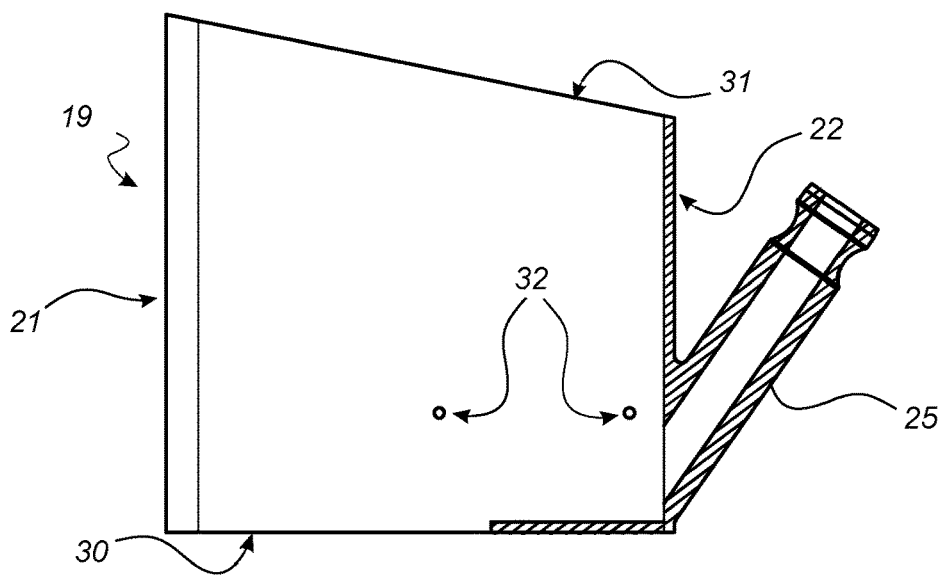
FIG. 5 shows a cross-sectional view of the dispenser device of FIG. 3, FIGS. 6a-b show an exemplary embodiment of the exchangeable housing part.

FIG. 4 shows the dispenser device 19 seen from a top side (see FIGS. 3 and 5). The dispenser device 19 comprises an inlet 25 for supplying the structural adhesive. The inlet 25 is shaped as a tube section connected to the reservoir 24, wherein a coupling element 26 is arranged on the free end of the tube section. The coupling element 26 is configured to be coupled to a dispensing system (see FIG. 12) via a hose.

Figure 6:
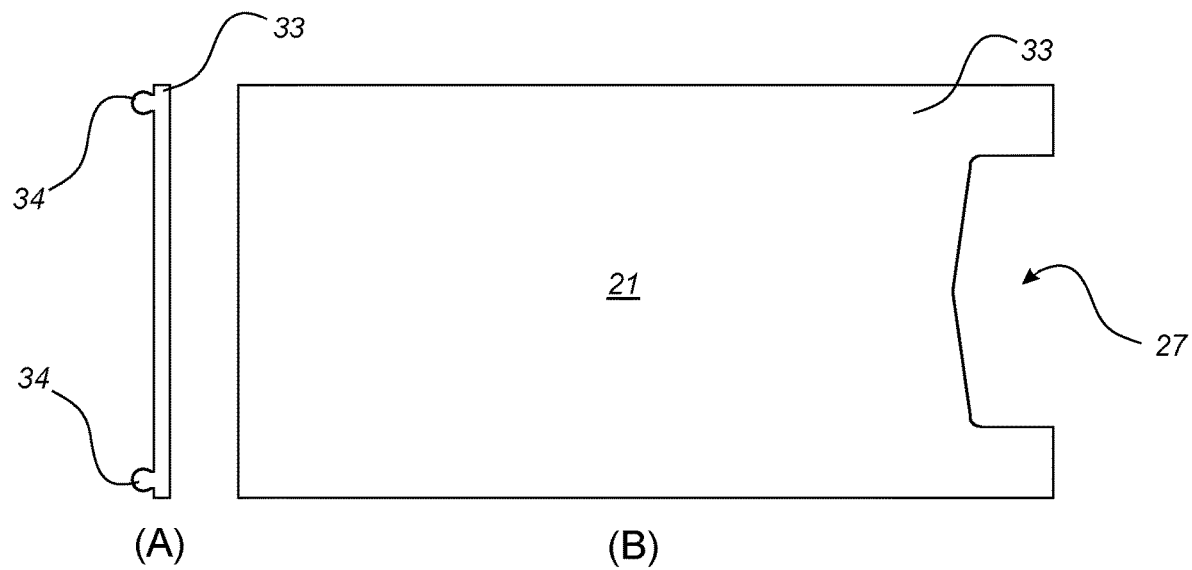

The dispenser device 19 further comprises an outlet 27 for dispensing the structural adhesive. The outlet 27 comprises a combined side and bottom opening connected to the reservoir 24. The side opening is arranged in the front side 21 as shown in FIG. 6b while the bottom opening is arranged in a bottom side (see FIG. 5) of the housing 20. Here, the front side 21 of the housing 20 is removed for illustrative purposes.

A bottom plate 28 is attached or integrated into the housing 20 and extend partly along the bottom side, as illustrated in FIGS. 4 and 5.

The housing 20 comprises coupling elements 29 arranged in the walls of the opposite sides 23. The coupling elements 29 are configured to be coupled to matching coupling elements (see FIG. 6a) located on an exchangeable housing part (see FIG. 6b).

FIG. 5 shows a cross-sectional view of the dispenser device 19 with the front side 21 removed for illustrative purposes. The bottom opening of the outlet 27 extend along a part of the bottom side 30 from the front side 21 towards the back side 22, as illustrated in FIGS. 4 and 5.

The housing 20 further defines a top side 31 located at opposite end of the bottom side 30. The top side 31 is here angled towards the back side 22 relative to the bottom side 30. The top side 31 is optionally prepared for mounting of a top plate (see FIGS. 8a-b).

The housing 20 further comprises a set of holes 32 for mounting a distributing plate (see FIG. 7b) at a distance above the bottom plate 28. The distributing plate is mounted above the inlet 25 so that the structural adhesive is lead into the reservoir 24 between the distributing plate and the bottom plate 28.

FIGS. 6a-b show an exemplary embodiment of the exchangeable housing part 33 defining the front side 21. The housing part 33 comprises matching coupling elements 34 configured to be coupled to the coupling elements 29 of the housing 20, as illustrated in FIG. 6a. The side opening of the outlet 27 extend along a part of the front side 21 from the bottom side 30 towards the top side 31, as illustrated in FIG. 6b.

The structural adhesive is dispensed through the outlet 27 and forms a line of paste (see FIG. 12) having a cross-sectional profile, a width and a height substantially corresponding to the cross-sectional profile, width and height of the side opening of the outlet 27. The cross-sectional profile, the width and/or the height of the line of paste 49 is changed before dispensing by exchanging the current housing part 33 with another housing part 33 having a side opening with a different cross-sectional profile, width and/or height.

Figure 7:
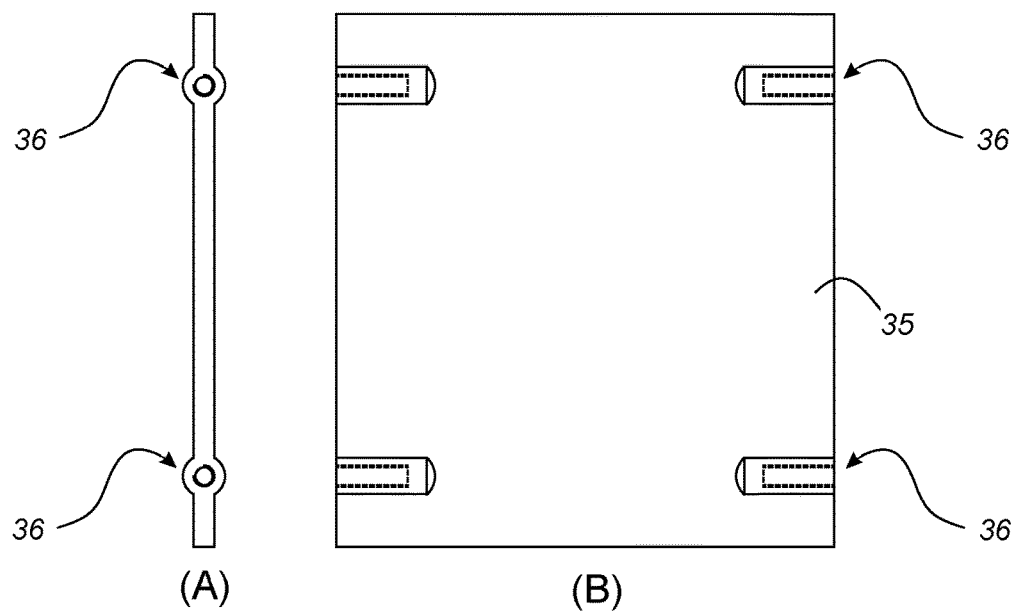
FIGS. 7a-b show an exemplary embodiment of a distributing plate.

FIGS. 7a-b show an exemplary embodiment of the distributing plate 35 configured to distribute the supplied structural adhesive into the reservoir 24. The distributing plate 35 comprises a set of holes 36 configured to receive a fastener element, e.g. a bolt or screw, used to mount the distributing plate to the housing 20, as illustrated in FIG. 7a.

A set of holes 32 is arranged on either sides 23 of the housing and a corresponding set of holes 36 is arranged on either side of the distributing plate 35, as illustrated in FIG. 7b. This enables the distributing plate 35 to be firmly secured during operation of the dispenser device 19.

Figure 8:
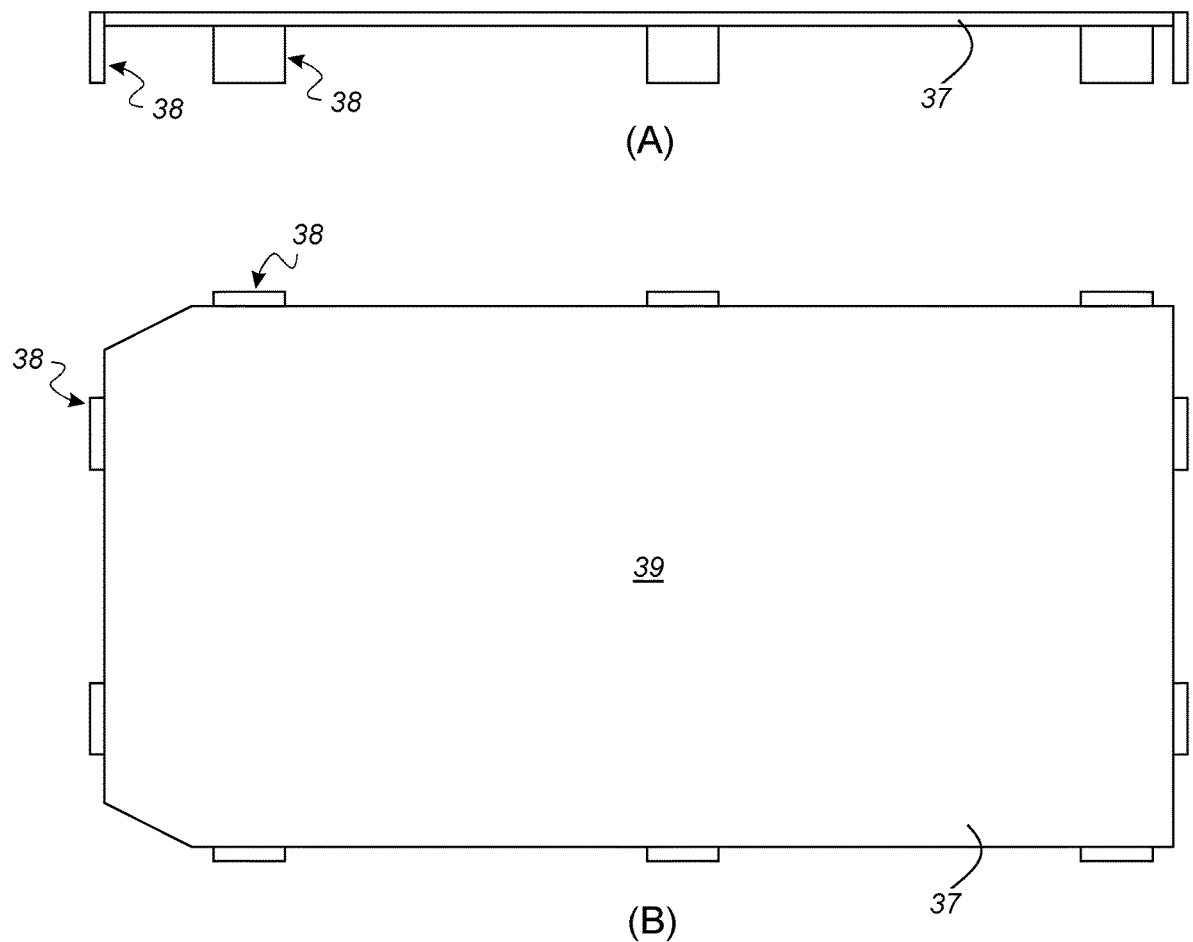
FIGS. 8a-b show an exemplary embodiment of a top plate.

FIGS. 8a-b show an exemplary embodiment of the top plate 37 configured for mounting on the top side 31 of the dispenser device 19. The top plate 37 has a length and width substantially corresponding to the length and width of the housing 20.

The top plate 37 here comprises a plurality of projecting elements shaped as fingers 38 configured to contact the upper section of the housing 20. The fingers 38 are configured to engage a side surface of the housing or, optionally, a matching recess formed in the side surface, e.g. forming a press fit. The fingers 38 enable the top plate 37 to be secured to the housing 20 during operation.

The top plate 37 is here made of a transparent material so that the entire top surface of the top plate 37 acts as a window 39 for visual inspection of the structural adhesive in the reservoir 24.

Figure 9:
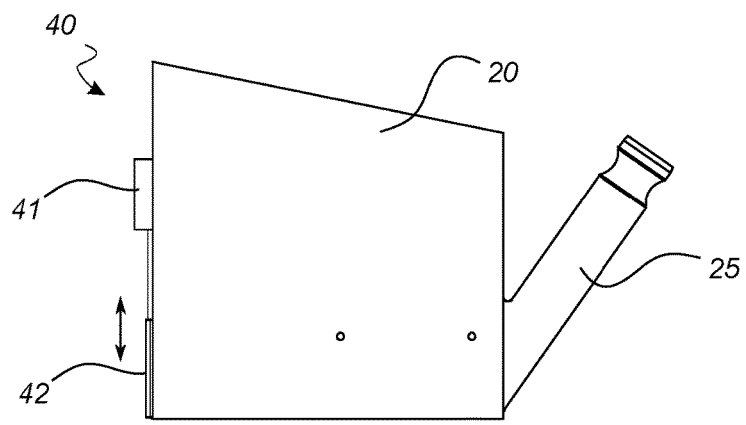
FIG. 9 shows a second exemplary embodiment of the dispenser device according to the invention.

FIG. 9 shows a second exemplary embodiment of the dispenser device 40 comprising an adjustable mechanism configured to change the cross-sectional profile, width and/ or height of the dispensed structural adhesive. Here, the adjustable mechanism is configured as an actuator unit 41 arranged on the housing 20'.

The actuator unit 41 is connected to at least one moveable plate member 42 arranged relative to the outlet 27, e.g. the side opening thereof. The actuator unit 41 is configured to move the plate member 42 between a retracted position and an extended position, as illustrated by the arrow. The operation of the adjustable mechanism, e.g. the actuator unit 41, is controlled by a control unit (see FIG. 12) which can be operated by a technician. Moving the plate member 42 into or out of the extended position causes the plate member 42 to at least partly cover the outlet 27 and thus change the cross-sectional profile, width and/or height of the dispensed structural adhesive.

The front side 21 of the housing 20' may be formed by the exchangeable housing part 33 or a front wall 33' of the housing 20'.

Figure 10:
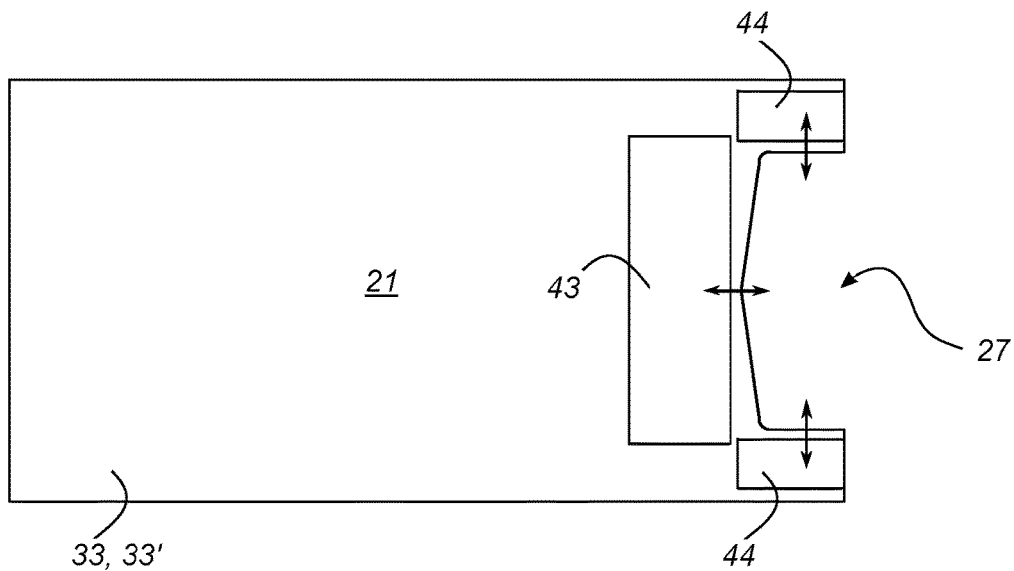
FIG. 10 shows the front side of the dispenser device of FIG. 9 with three plate members.

FIG. 10 shows the front side 21 of the housing 20' of the dispenser device 40 with a plurality of individual plate members. Here, three plate members are arranged relative to the side opening of the outlet 27.

A first plate member 43 is arranged above the side opening while a second plate member 44 is arranged at either sides of the side opening. Each of the first and second plate members 43, 44 is connected to an actuator unit (not shown in FIG. 10) used to move the respective plate members 43, 44 between the retracted and extended positions. The plate member of FIG. 9 is shown in its extended position while the first and second plate members 43, 44 of FIG. 10 are shown in their retracted positions.

As illustrated in FIG. 10, the local bottom side of the first plate member 43 has a different edge profile that the local top side of the side opening. As further illustrated in FIG. 10, the local side of the second plate member 44 has the same edge profile as the local side of the side opening.

Figure 11:
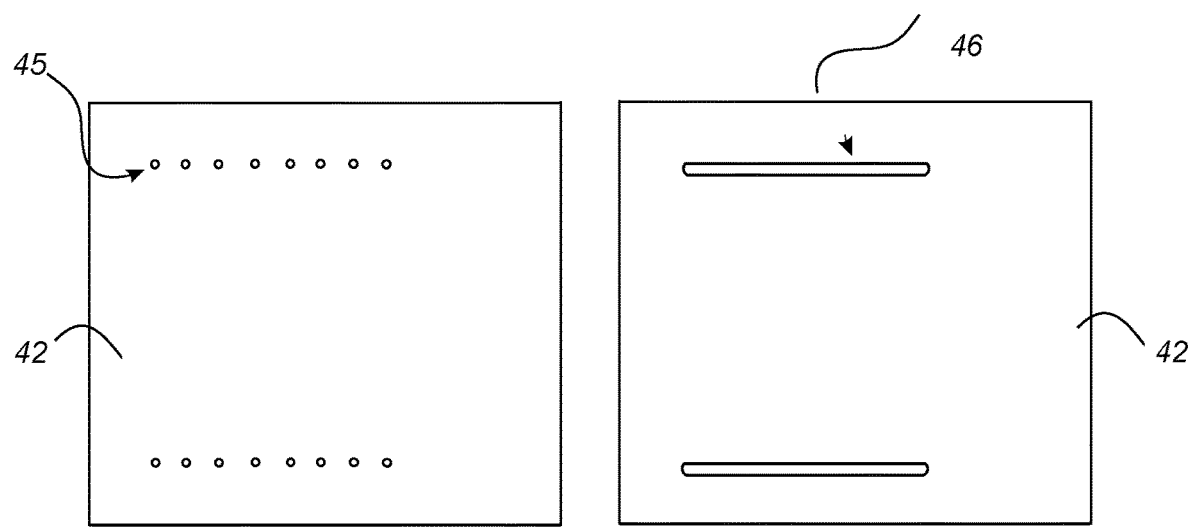
FIG. 11 shows two plate members with rows of holes and elongated holes respectively.

FIG. 11 shows the plate member 42 with two different embodiments of the adjustable mechanism. Here, the actuator unit is omitted and the plate member is operated manually by the technician.

The adjustable mechanism is here configured as two rows of holes 45 or elongated holes 46 configured to be aligned with at least one matching hole (not shown in FIG. 11) located on the housing 20, 20'. The plate member 42 can be moved by align a selected hole 45 with the matching hole of the housing 20, 20', or by moving the elongated hole 46 relative to the matching hole of the housing 20, 20'. The plate member 42 can be secured in any desired position by inserting a fastener element, e.g. a bolt or pin, into the aligned holes.

Figure 12:
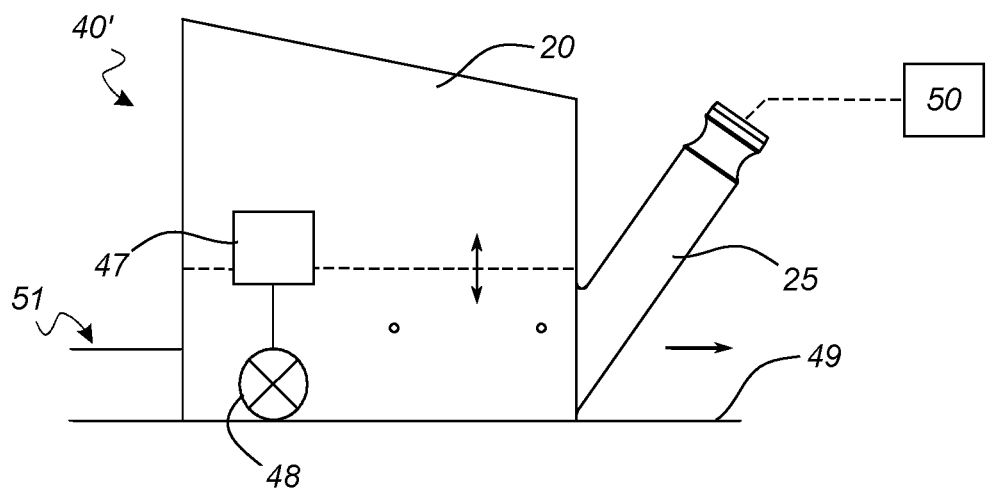
FIG. 12 shows the dispenser device with exemplary embodiment of a control unit and of a distance measuring unit.

FIG. 12 shows the dispenser device 40' with an exemplary embodiment of the control unit 47 and of a distance measuring unit 48. The control unit 47 is configured to control the operation of the adjustable mechanism, e.g. the actuator unit 41. The control unit 47 is further connected to the distance measuring unit 48 which is configured to measure a signal indicative of a distance. The control unit 47 uses this signal to determine the distance travelled along the application surface 49 relative to a reference position. Here, the distance measuring unit 48 is configured as a rotary measuring wheel.

The application surface 49 is located on the wind turbine structure, e.g. a blade shell part, the main laminate, the shear web or box beam.

The dispenser device 40' is coupled to the dispensing system 50 which is configured to supply the structural adhesive (indicated by dashed line) into the reservoir 24 via the inlet 25. The structural adhesive is dispensed through the outlet 27 and forms a line of paste 51 having a cross-sectional profile, a width and a height as the dispenser device 40' is moved (indicated by arrow) along the application surface 49. Variations in the supply rate or pressure and in the moving speed are equalised by the varying amount of structural adhesive (indicated by arrow) inside the reservoir 24.

Figure 13:
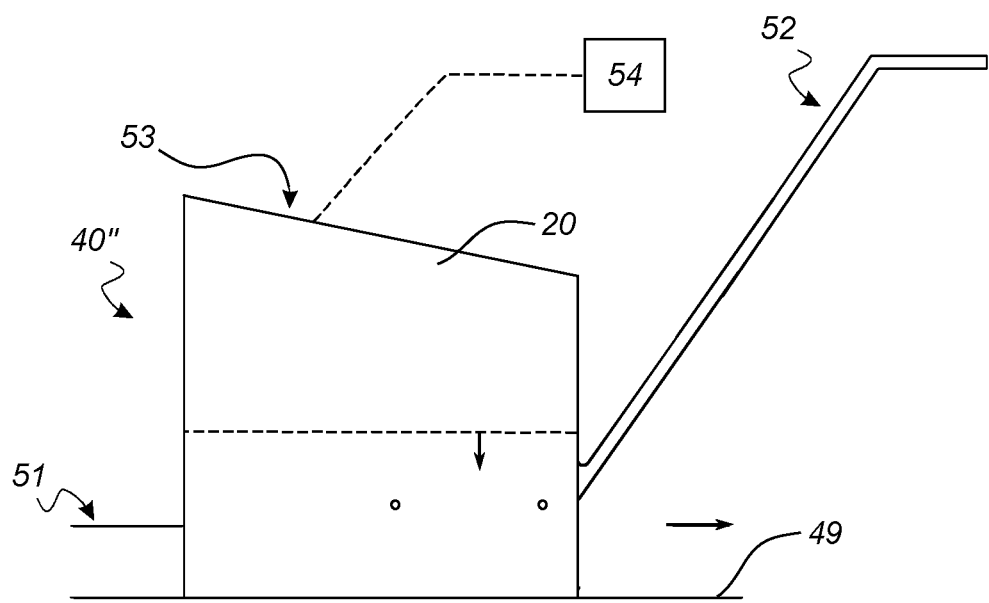
FIG. 13 shows the dispenser device with exemplary handle unit.

FIG. 13 shows the dispenser device 40" with an exemplary handle unit 52 connected to the housing 20. The handle unit 52 comprises a shaft element attached to the housing 20 at the one end and further to a handle at the other end. The technician may use this handle unit 52 to move the dispenser device 40" along the application surface 49. Variations in the moving speed or shakings is compensated by the amount of structural adhesive (indicated by arrow) inside the reservoir 24.

The dispenser device 40" has atop opening 53 arranged in the top side 31 of the housing 20. The top opening 53 acts as the inlet 25 for supplying structural adhesive into the reservoir 24. The structural adhesive may be supplied manually via the top opening 53 using containers 54 or the dispenser system 50.

The cross-sectional profile, the width and/or the height of the line of paste 51 is changed during dispensing by moving one or more of the plate members 42, 43, 44 relative to the side opening of the outlet 27, as described above. The line of paste 51 can thus be applied with a variable cross-sectional profile, width and/or height along the length of the application surface 49.

The abovementioned embodiments may be combined in any combinations without deviating from the present invention.

The invention claimed is:
1. A dispenser device (19, 40) for applying a structural adhesive to a wind turbine blade (5) structure, comprising:
at least one inlet (25) for supplying a structural adhesive into the dispenser device (19, 40) and at least one outlet (27) for dispensing said structural adhesive out of the dispenser device (19, 40), wherein the at least one outlet (27) is configured to be positioned relative to an application surface (49) of the wind turbine blade (5) structure, said at least one inlet (25) comprising a coupling element (26) configured to be coupled to a dispensing system (50), the dispensing system (50) being configured to supply the structural adhesive into the dispenser device (19, 40) at a supply rate,
wherein the dispenser device (19, 40) is configured to apply the structural adhesive onto the application surface (49) at a dispense rate when the dispenser device (19, 40) is manually moved along said application surface (49),
wherein the dispenser device (19, 40) further comprises a housing (20) forming at least one reservoir (24) configured to temporarily hold a surplus of structural adhesive during dispensing, wherein the housing (20) has a bottom side (30), a top side (31), a front side (21), a back side (22) and two opposite sides (23) located between the front side (21) and the back side (22), wherein the bottom side (30) faces the application surface (49) during dispensing, wherein the at least one reservoir (24) is connected to said at least one inlet (25) and further connected to said at least one outlet (27), and wherein the at least one reservoir (24) is configured to equalize the dispense rate and pressure within the at least one reservoir (24) during dispensing, wherein the dispenser device (40) further comprises an adjustable mechanism configured to change at least the cross-sectional profile, the width or the height of the dispensed structural adhesive, wherein said at least one outlet (27) is a side opening arranged in the housing (20) and said adjustable mechanism is connected to at least one moveable plate member (42), wherein said at least one moveable plate member (42) is configured to be moved relative to the side opening causing a change in at least the cross-sectional profile, the width or the height of the dispensed structural adhesive, wherein said at least one moveable plate member (42) comprises a first moveable plate member (43) and at least a second moveable plate member (44), and wherein the first moveable plate member (43) is configured to be moved independently or synchronously relative to the at least second plate member (44), and wherein the first moveable plate member and the second moveable plate member are each disposed on a front side of the housing.

2. The dispenser device according to claim 1, wherein said top side (31) comprises at least one top opening (53) connected to the at least one reservoir (24) or a top surface in which at least one transparent window (39) is arranged.

3. The dispenser device according to claim 1, wherein said housing (20) further comprises at least one exchangeable housing part (33), wherein the side opening is arranged in said at least one exchangeable housing part (33).

4. The dispenser device according to claim 1, wherein said adjustable mechanism comprises at least one actuator unit (41) electrically connected to a control unit (47) configured to control the movement of the at least one actuator unit (41).

5. The dispenser device according to claim 4, wherein the dispenser device (40') further comprises at least one distance measuring unit (48) electrically connected to the control unit (47), wherein the control unit (47) configured to determine a travelled distance along the application surface (49).

6. The dispenser device according to claim 1, wherein the dispenser device (19, 40) is configured to apply the structural adhesive at a pressure between 0.1 bars and 10 bars.

7. The dispenser device according to claim 1, wherein said adjustable mechanism comprises at least one row of holes (45) configured to receive a fastener element.

8. The dispenser device according to claim 1, wherein said adjustable mechanism comprises at least one elongated hole (46) arranged on at least the housing (20), wherein said at least one elongated hole (46) is configured to receive a fastener element.

9. The dispenser device according to claim 1, wherein said adjustable mechanism comprises at least one elongated hole (46) arranged on the at least one moveable plate member (42), wherein said at least one elongated hole (46) is configured to receive a fastener element.

10. The dispenser device according to claim 1, further comprising a handle unit (52) connected to the housing (20) for moving the dispenser device along the application surface (49).

11. A method of applying a structural adhesive to an application surface (49) on a wind turbine blade (5) structure, comprising:
   providing the dispenser device (19, 40) according to claim 1;
   coupling the dispensing system (50) to said dispenser device (19, 40);
   supplying the structural adhesive into the dispenser device (19, 40) via said at least one inlet (25) at the supply rate; and
   manually dispensing the structural adhesive via said at least one outlet (27) onto the application surface (49) at the dispense rate, wherein a moving speed of the dispenser device (19, 40) is adjusted during the manual dispensing of the structural adhesive to equalize the dispense rate and/or a volume of the surplus of the structural adhesive in the at least one reservoir (24) is adjusted to equalize pressure during the manual dispensing of the structural adhesive, wherein the method further comprises the step of:
   at least partially filling said at least one reservoir (24) in the dispenser device (19, 40) with the structural adhesive to equalize said dispense rate during said step of manually dispensing.

12. The method according to claim 11, wherein the structural adhesive is applied at a pressure of 0.1 bars to 10 bars.

13. The method according to claim 11, wherein the method further comprises at least one of the steps of:
   changing a cross-sectional profile of said at least one outlet (27) of the dispenser device (19) prior to dispensing the structural adhesive,
   changing a width of said at least one outlet (27) of the dispenser device (19) prior to dispensing the structural adhesive, and
   changing a height of said at least one outlet (27) of the dispenser device (19) prior to dispensing the structural adhesive.

14. The method according to claim 11, wherein the method further comprises at least one of the steps of:
   changing a cross-sectional profile of said at least one outlet (27) of the dispenser device (40) from a first cross-sectional profile to at least a second cross-sectional profile during said dispensing the structural adhesive,
   changing a width of said at least one outlet (27) of the dispenser device (40) from a first width to at least a second width during said dispensing the structural adhesive, and
   changing a height of said at least one outlet (27) of the dispenser device (40) from a first height to at least a second height during said dispensing the structural adhesive.

15. The method according to claim 11, wherein the step of manually dispensing the structural adhesive comprises continuous and uniform dispensing of the structural adhesive.

16. A dispenser device (19, 40) for applying a structural adhesive to a wind turbine blade (5) structure, comprising:
   at least one inlet (25) for supplying a structural adhesive into the dispenser device (19, 40) and at least one outlet (27) for dispensing said structural adhesive out of the dispenser device (19, 40), wherein the at least one outlet (27) is configured to be positioned relative to an application surface (49) of the wind turbine blade (5) structure, said at least one inlet (25) comprising a coupling element (26) configured to be coupled to a dispensing system (50), the dispensing system (50) being configured to supply the structural adhesive into the dispenser device (19, 40) at a supply rate, wherein the dispenser device (19, 40) is configured to apply the structural adhesive onto the application surface (49) at a dispense rate when the dispenser device (19, 40) is manually moved along said application surface (49), wherein the dispenser device (19, 40) further comprises a housing (20) forming at least one reservoir (24) configured to temporarily hold a surplus of structural adhesive during dispensing, wherein the housing (20) has a bottom side (30), a top side (31), a front side (21), a back side (22) and two opposite sides (23) located between the front side (21) and the back side (22), wherein the bottom side (30) faces the application surface (49) during dispensing, wherein the at least one reservoir (24) is connected to said at least one inlet (25) and further connected to said at least one outlet (27), and wherein the at least one reservoir (24) is configured to equalize the dispense rate by varying an amount of structural adhesive inside the reservoir during dispensing, wherein the dispenser device (40) further comprises an adjustable mechanism configured to change at least the cross-sectional profile, the width or the height of the dispensed structural adhesive, wherein said at least one outlet (27) is a side opening arranged in the housing (20) and said adjustable mechanism is connected to at least one moveable plate member (42), wherein said at least one moveable plate member (42) is configured to be moved relative to the side opening causing a change in at least the cross-sectional profile, the width or the height of the dispensed structural adhesive, wherein said at least one moveable plate member (42) comprises a first moveable plate member (43) and at least a second moveable plate member (44), and wherein the first moveable plate member (43) is configured to be moved independently or synchronously relative to the at least second plate member (44), and wherein the first moveable plate member and the second moveable plate member are each disposed on a front side of the housing.

17. A dispenser device (19, 40) for applying a structural adhesive to a wind turbine blade (5) structure, comprising:

at least one inlet (25) for supplying a structural adhesive into the dispenser device (19, 40) and at least one outlet (27) for dispensing said structural adhesive out of the dispenser device (19, 40), wherein the at least one outlet (27) is configured to be positioned relative to an application surface (49) of the wind turbine blade (5) structure, said at least one inlet (25) comprising a coupling element (26) configured to be coupled to a dispensing system (50), the dispensing system (50) being configured to supply the structural adhesive into the dispenser device (19, 40) at a supply rate, wherein the dispenser device (19, 40) is configured to apply the structural adhesive onto the application surface (49) at a dispense rate when the dispenser device (19, 40) is manually moved along said application surface (49), wherein the dispenser device (19, 40) further comprises a housing (20) forming at least one reservoir (24) configured to temporarily hold a surplus of structural adhesive and air inside the reservoir above the structural adhesive during dispensing, wherein the housing (20) has a bottom side (30), a top side (31), a front side (21), a back side (22) and two opposite sides (23) located between the front side (21) and the back side (22), wherein the bottom side (30) faces the application surface (49) during dispensing, wherein the at least one reservoir (24) is connected to said at least one inlet (25) and further connected to said at least one outlet (27), and wherein the at least one reservoir (24) is configured to equalize the dispense rate during dispensing, wherein the dispenser device (40) further comprises an adjustable mechanism configured to change at least the cross-sectional profile, the width or the height of the dispensed structural adhesive, wherein said at least one outlet (27) is a side opening arranged in the housing (20) and said adjustable mechanism is connected to at least one moveable plate member (42), wherein said at least one moveable plate member (42) is configured to be moved relative to the side opening causing a change in at least the cross-sectional profile, the width or the height of the dispensed structural adhesive, wherein said at least one moveable plate member (42) comprises a first moveable plate member (43) and at least a second moveable plate member (44), and wherein the first moveable plate member (43) is configured to be moved independently or synchronously relative to the at least second plate member (44), and wherein the first moveable plate member and the second moveable plate member are each disposed on a front side of the housing.

\* \* \* \* \*